United States Patent [19]
Burkhard et al.

[11] Patent Number: 5,856,638
[45] Date of Patent: Jan. 5, 1999

[54] WEIGHING APPARATUS HAVING TEMPERATURE-MODIFIED ELECTROMAGNETIC COMPENSATION MEANS

[75] Inventors: Hans-Rudolf Burkhard, Wila; Qihao Yuan, Zurich, both of Switzerland

[73] Assignee: Mettler-Toledo GmbH, Greifensee, Switzerland

[21] Appl. No.: 826,366

[22] Filed: Apr. 9, 1997

[30] Foreign Application Priority Data

Jul. 19, 1996 [CH] Switzerland .................... 1815/96

[51] Int. Cl.[6] ............................ G01G 3/14
[52] U.S. Cl. .......................... 177/210 EM
[58] Field of Search .............. 177/210 EM, 212, 177/213, 214, 215

[56] References Cited

U.S. PATENT DOCUMENTS

| | | | |
|---|---|---|---|
| 4,091,886 | 5/1978 | Knothe et al. | 177/210 EM |
| 4,489,800 | 12/1984 | Nufer et al. | 177/212 |
| 4,545,448 | 10/1985 | Kunz | 177/212 |
| 4,722,409 | 2/1988 | Kunz | 177/212 |
| 4,730,683 | 3/1988 | Reichmuth | 177/212 |
| 4,938,300 | 7/1990 | Kunz | 177/164 |
| 5,141,066 | 8/1992 | Strickler | 177/212 |

FOREIGN PATENT DOCUMENTS

| | | |
|---|---|---|
| 3324402A1 | 8/1982 | Germany . |
| 8418503.1 | 7/1985 | Germany . |
| 07218323A | 1/1994 | Japan . |

OTHER PUBLICATIONS

*Physics*, Hans C. Ohanian, W.W. Norton & Company, Inc. New York, N.Y., pp. 900–902, 1985.

*Primary Examiner*—Randy W. Gibson
*Attorney, Agent, or Firm*—Laubscher & Laubscher

[57] ABSTRACT

Weighing apparatus of the electromagnetic load compensation type includes a thermal conductor for transmitting coil heat from the internal region adjacent the air gap of a permanent magnetic field within which the compensation coil is arranged to a remotely-arranged thermal sensor, thereby to dissipate the coil heat and to modify as a function of internal temperature the compensating current that is supplied to the compensation coil. As a consequence of the dissipation of heat from the air gap, heating of the permanent magnet and its pole member is avoided, thereby, to prevent variation of the intensity of the permanent magnet field.

11 Claims, 3 Drawing Sheets

WEIGHING APPARATUS HAVING TEMPERATURE-MODIFIED ELECTROMAGNETIC COMPENSATION MEANS

BACKGROUND OF THE INVENTION

1. Field of the Invention

A weighing balance of the electromagnetic load compensation type includes a thermal conductor for dissipating the internal heat generated by the compensation coil to a temperature sensor located remotely from the air gap containing the compensation coil, thereby to modify the compensation current to produce a more accurate load measurement.

2. Brief Description of the Prior Art

Weighing scales or balances of the electromagnetic load compensation type are well known in the patented prior art, as evidenced, for example, by the U.S. Pat. Nos. to Kunz Nos. 4,545,448, 4,722,409 and 4,938,300, and Strickler No. 5,141,066, among others. In these known weighing systems, the magnitude of the load applied to the load-receiving member is displayed as a function of the compensation current supplied to the compensation coil to maintain the movable load-receiving member in a given position relative to its fixed support. The compensation coil is connected for movement with the load-receiving member and extends within the air gap of a stationary permanent magnetic field produced by a permanent magnet carried by the fixed support. The intensity of the magnetic field produced by the permanent magnet means is influenced, for example, by the load-responsive compensation current and/or by the heat generated by the compensation current in the coil, and consequently, compensation is required to eliminate the adverse influences affecting the accuracy of the load measurement. In this regard, one must distinguish between short-term and long-term temperature changes.

The compensation of long-term temperature changes, such as occur when the balance is turned on, has been known for a long time, and various proposals have been presented in the prior art.

In the electrical balance proposed in the German patent No. DE-GM-84118503, an aluminum tubular member is inserted by a press fit or by means of a heat-conducting filler between the active magnetic core and the magnetic yoke member. The aluminum tube contains a bore in which is mounted a temperature sensor that receives temperature changes produced by the heat dissipated from the pole piece with which the aluminum tube is in good heat-conducting engagement. The heat-conducting aluminum tube affords rapid heat dissipation from the pole piece of the permanent magnet system. It thus constitutes a heat diverting bridge that produces a reduced heating of the active magnetic core, and thus diminishes sensitivity changes in the permanent magnet system that are caused by heat. Regardless of the good heat conductivity of the aluminum tube, a temperature change may be sensed by the temperature sensor only after a certain degree of delay, which means that any electronic correction will also be delayed. The aluminum tube can also be arranged to form a gap relative to the active magnet core, and the heat from the pole flange can be dissipated directly downwardly for measurement by the temperature sensor. In both embodiments, the temperature change of the pole piece is measured indirectly, and the pole piece conducts further downwardly the radiation heat absorbed by the coil.

In the German patent No. DE-A1-3324402, a temperature sensor is inserted within a bore contained in the permanent magnet system to measure the heating of the magnet by the load-dependent current in the coil. A time delay is therefore unavoidable here also, since first of all, the pole piece and the permanent system have to be heated up before the temperature sensor can detect the temperature change. The deleterious consequences of the temperature change occurring in the permanent magnet appear immediately, and the corresponding compensation can occur only after some time delay.

The Japanese patent No. A-07218323 discloses an electromagnetic balance including a temperature sensor inserted within a recess contained in the pole piece directly opposite the coil for measuring the adjacent temperature in the magnetic system. A plate is provided that spans the recess. Using this known arrangement of the temperature sensor on the face of the pole piece, the temperature is measured before the dissipated heat of the coil can heat the pole flange and, more particularly, before the heat reaches the permanent magnet. This can result in an over reaction during the compensation of the effect of the temperature change on the permanent magnet. The temperature is measured directly within the effective range of the compensation coil, so that the temperature sensor is not subjected to heat in the same manner as the heat-sensitive permanent magnet from which the temperature change is produced. As distinguished from the previously discussed patents, the apparatus of the Japanese patent measures the temperature change too quickly, with the result that the measured temperature change is not in agreement with the change produced by the heating of the permanent magnet.

SUMMARY OF THE INVENTION

Accordingly, a primary object of the present invention is to provide an improved weighing apparatus of the electromagnetic load compensation type including compensating means responsive to internal temperature changes within the permanent magnet system for automatically compensating for temperature changes whenever there is a change in the measurement result. In particular, the system is responsive to the rapid temperature changes caused by the compensation coil at an optimum point of time. Such temperature changes may, for example, be caused by significant changes in the amount of load between consecutive weighing operations.

According to a more specific object of the invention, a thermal conductor is provided that extends within the permanent magnet system to dissipate to a remotely located temperature sensor the internal heat that is generated adjacent the air gap in the permanent magnetic field within which the compensation coil is movably arranged.

In one embodiment, the thermal conductor is generally funnel-shaped and includes a stem portion that extends through a through bore contained in the permanent magnet, the free end of the stem portion containing a cavity within which the temperature sensor is mounted, whereby the internal heat produced by the compensation coil adjacent the air gap which otherwise would heat the pole piece and the permanent magnet is dissipated before there is any deleterious effect on the measurement values. The temperature change measure by the temperature sensor occurs at a point in time that can be used in an optimum fashion to compensate for the effect of heating that would otherwise generate measurement errors. The physical arrangement of the temperature sensor outside the direct range of influence of the dissipated heat from the coil prevents over reaction, and the subsequent temperature rise of the permanent magnet system can be compensated for by the short time delay of the heat flow in the thermal conductor to the temperature sensor.

The funnel-shaped thermal conductor can be made relatively inexpensively and can be inserted without effect within the permanent magnet system. Design changes of the balance are necessary only to a very minor extent.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
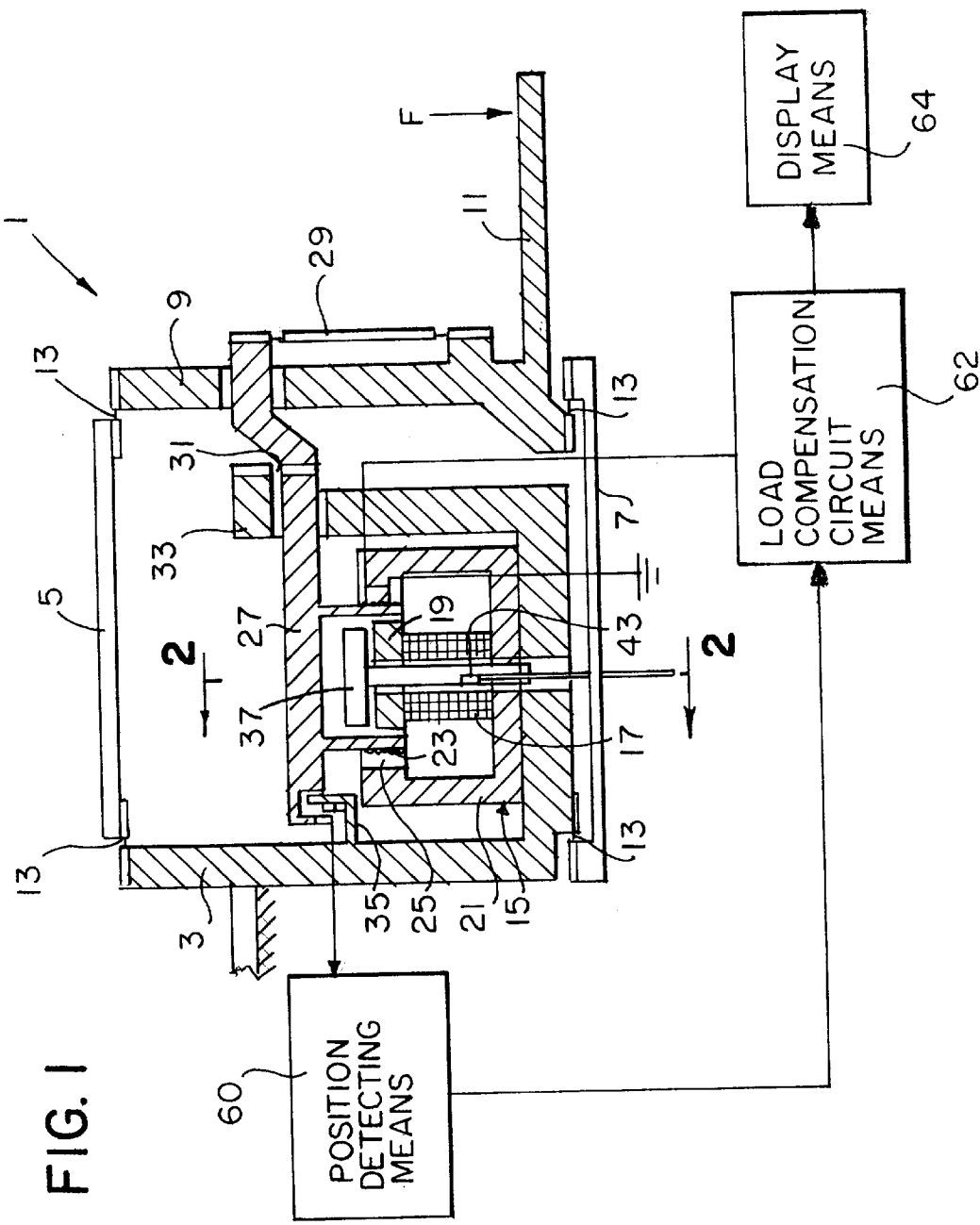
FIG. 1 is a somewhat diagrammatic longitudinal sectional view of the weighing scale of the present invention.
Figure 2:
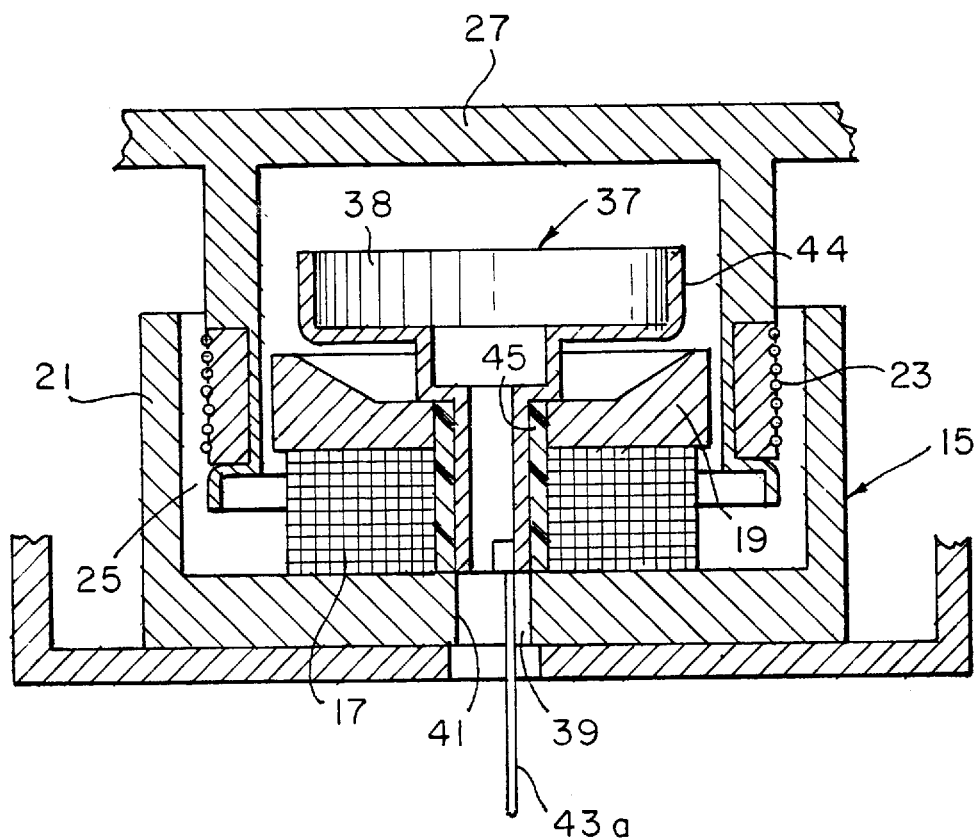
FIG. 2 is a detailed view of the permanent magnet system of FIG. 1.

Referring first more particularly to FIGS. 1 and 2, the weighing scale 1 of the present invention includes a stationary frame or housing 3 to which is connected for vertical guided displacement by the parallelogram arms 5 and 7 and flexure bearings 13 the moveable load-receiving member 9 having a load-receiving platform 11 that receives the load F to be measured. Pivotally supported intermediate its ends by flexure bearing 31 and column portion 33 of the stationary housing 3 is the load transmitting lever 27 that is connected at a first end with the load-receiving arm 9 by connecting rod 29. At its other end, the lever 27 cooperates with a photo-optical position sensor 35 to supply a position-responsive signal to stationary position detecting means 60 mounted on the housing 3. Intermediate the flexure bearing support means 31 and the said other end of the lever 27 is mounted the annular load-compensation coil 23 that is arranged for vertical displacement within the stationary annular air gap 25 of the permanent magnet field produced by the generally pot-shaped permanent magnetic means 15 including permanent magnet 17 having at one end a pole piece 19 that is concentrically spaced from the surrounding annular portion of the pot-shaped ferromagnetic yoke member 21 that is fixed to the stationary housing 3.

As is known in the art, the position-responsive signal from the detector 35, which is produced as a consequence of the application of the load F to the platform 11, is supplied via position detector means 60 to the load compensation circuit means 62 to produce compensating current I that is supplied to the coil 23 to produce an electromotive force that reacts with the stationary permanent magnet field to maintain the lever 27 at its initial no-load position, the magnitude of the compensation current being a function of the load to be measured which is displayed on the display means 64.

In accordance with a characterizing feature of the present invention, a tubular generally funnel-shaped heat-conducting member 37 having an enlarged generally conical upper head portion 38 is provided for dissipating the heat that is generated internally of the electromagnetic load-compensating means adjacent the air gap 25 and for transmitting this internal heat to a temperature sensor 43 that is mounted in a cavity contained in the lower extremity of the stem portion 39 of the thermal conductor that extends through the centers of both the annular pole piece 19 and the annular permanent magnet 17, through the central bore 41 contained in the yoke member 21, and through a corresponding bore contained in the housing 3. The temperature sensor 43 transmits to the load compensation circuit means a temperature compensating signal that is a function of the internal heat generated within the electromagnetic load compensation means adjacent the air gap, thereby to improve the accuracy of the weight signal displayed by the display means 64. Preferably the stem portion 39 is insulated against ambient temperature by means of an outer concentric layer 45 of shrink-fit synthetic plastic thermal insulating tubing, such as that produced by Otto Pfenninger AG of Staefa, Switzerland. The thermal conductor 37 is formed of a suitable metal, such as aluminum or copper, having a high coefficient of heat conductivity, and the temperature sensor 43 is secured to the associated cavity wall of the stem portion by a suitable heat-transmissive paste, such as Dow Corning 340 heat sink paste, for example. The diameter of the upper portion 38 of the thermal conductor member is generally on the order of that of the magnet pole piece 19. Thus, the heat that is generated by, and which radiates inwardly from, the coil 23 during the load compensation operation arrives not only at the pole piece 19, but also simultaneously and directly at the periphery 44 of the enlarged head portion 38 of the thermal conductor. Preferably the surface of the thermal conductor 37 is painted black or is anodized in order to absorb heat in an optimum manner. Because of the high thermal conductivity of the thermal conductor 37, each temperature change—be it a temperature rise or a temperature fall—is transmitted in the fastest possible way and is sensed by the temperature sensor 43. An incremental change in temperature reaches the sensor via thermal conductor 37 faster than via the pole piece 19 or permanent magnet 17, owing to the lower heat conductivity of the pole piece and the magnet. In this way, it is possible to compensate electronically for temperature variations at the correct time by the temperature sensor 43. The leads to the temperature sensor extend through the magnet system.

Figure 3:
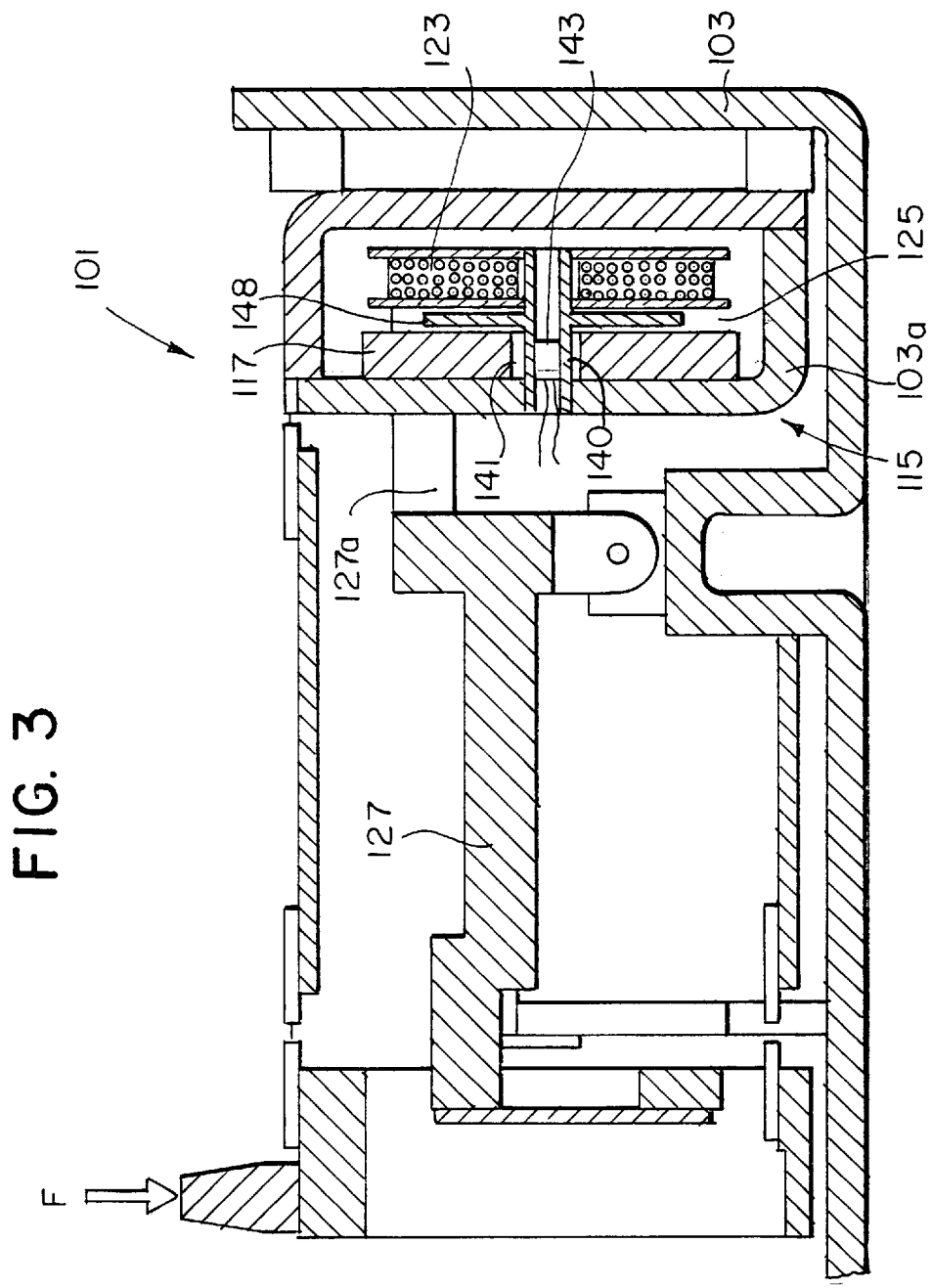
FIG. 3 is a longitudinal sectional view of another embodiment of the invention.

Referring to the modification of FIG. 3, the weighing scale 101 includes a stationary permanent magnet system 117 that is supported by the housing 103, the movable compensation coil 123 being connected with the pivotable lever 127 by a pair of spaced lever extensions 127a, thereby to define an annular air gap 125. In this embodiment, the thermal conductor 140 is tubular and includes an external annular flange portion 148 that extends within the air gap 125. The tubular temperature conductor extends through the bore contained in the annular coil 123, the bore 141 of the annular permanent magnet 117, and the housing transverse wall portion 103a. Preferably the temperature sensor 143 is secured by heat conductive paste to the inner wall surface of the thermal conductor opposite the permanent magnet 117. In this embodiment the thermal conductor 140 functions in the same manner as the thermal conductor 37 of FIGS. 1 and 2. Of course, by forming the temperature sensor 140 as a tube, the temperature change of the coil 123 is acquired faster, but owing to the arrangement of the sensor 143 at the other end of the thermal conductor, the measurement is obtained with a certain delay.

While the heat-conducting member has been illustrated and described as being tubular, it is apparent that at least portions of this member could be of solid construction.

While in accordance with the provisions of the Patent Statutes the preferred forms and embodiments of the invention have been disclosed, it will be apparent that changes may be made without deviating from the inventive concepts set forth above.

What is claimed is:

1. Weighing apparatus, comprising:
   (a) a frame (3);
   (b) load-receiving means (9, 11) connected with said frame for movement from an initial first position relative to said frame;

(c) electromagnetic compensation means for displacing said load-receiving means toward said first position relative to said frame, said electromagnetic compensation means including:
  (1) means (15) connected with said frame for producing a stationary permanent magnetic field having an axis of symmetry and containing an air gap (25);
  (2) coil means (23) connected with said load-receiving means for movement in said air gap;
  (3) position detecting means (35) for detecting displacement of said load-receiving means from said first position upon the application thereto of a load to be measured;
  (4) compensating means for supplying compensating current to said coil means to produce a restoring electromagnetic force to maintain said load-receiving means at said first position against the force of the applied load; and
  (5) load-indicating means for displaying the magnitude of the applied load as a function of said compensating current; and
(d) means for modifying said compensating current as a function of the instantaneous temperature adjacent said air gap, including:
  (1) a temperature sensor (43) positioned remote from said air gap; and
  (2) thermal conductor means (37) arranged adjacent said axis of symmetry for transmitting heat from said air gap to said temperature sensor, said thermal conductor means including a tubular generally funnel-shaped thermal conductor (37).

2. Apparatus as defined in claim 1, wherein said thermal conductor means is rotationally symmetrical.

3. Apparatus as defined in claim 1, wherein said means for producing said permanent magnetic field, said air gap and said coil means are annular and concentrically arranged about said thermal conductor means.

4. Apparatus as defined in claim 1, wherein said thermal conductor has a longitudinal axis that is collinear with said field-producing axis of symmetry.

5. Apparatus as defined in claim 1, and further including heat-conducting means for securing said temperature sensor to said thermal conductor.

6. Apparatus as defined in claim 1, and further including a coating layer of heat-absorbing material arranged on said thermal conductor.

7. Apparatus as defined in claim 1, wherein said thermal conductor includes an enlarged head portion (38) that extends radially outwardly adjacent said air gap.

8. Weighing apparatus, comprising:
(a) a frame (3);
(b) load-receiving means (9, 11) connected for movement from an initial first position relative to said frame;
(c) electromagnetic compensation means for displacing said load-receiving means toward said first position relative to said frame, said electromagnetic compensation means including:
  (1) means (15) connected with said frame for producing a stationary permanent magnetic field having an axis of symmetry and containing an air gap (25);
  (2) coil means (23) connected with said load-receiving means for movement in said air gap;
  (3) position detecting means (35) for detecting displacement of said load-receiving means from said first position upon the application thereto of a load to be measured;
  (4) compensating means for supplying compensating current to said coil means to produce a restoring electromagnetic force to maintain said load-receiving means at said first position against the force of the applied load; and
  (5) load-indicating means for displaying the magnitude of the applied load as a function of said compensating current; and
(d) means for modifying said compensating current as a function of the instantaneous temperature adjacent said air gap, including:
  (1) a temperature sensor (43) positioned remote from said air gap; and
  (2) thermal conductor means (37) arranged adjacent said axis of symmetry for transmitting heat from said air gap to said temperature sensor, said thermal conductor means including a tubular thermal conductor having an annular outer flange portion (148) that extends within said air gap.

9. Weighing apparatus, comprising:
(a) a frame (3);
(b) load-receiving means (9, 11) connected for movement from an initial first position relative to said frame;
(c) electromagnetic compensation means for displacing said load-receiving means toward said first position relative to said frame, said electromagnetic compensation means including:
  (1) means (15) connected with said frame for producing a stationary permanent magnetic field having an axis of symmetry and containing an air gap (25), said field producing means including a permanent magnet (17) having an end pole member (19);
  (2) coil means (23) connected with said load-receiving means for movement in said air gap;
  (3) position detecting means (35) for detecting displacement of said load-receiving means from said first position upon the application thereto of a load to be measured;
  (4) compensating means for supplying compensating current to said coil means to produce a restoring electromagnetic force to maintain said load-receiving means at said first position against the force of the applied load; and
  (5) load-indicating means for displaying the magnitude of the applied load as a function of said compensating current; and
(d) means for modifying said compensating current as a function of the instantaneous temperature adjacent said air gap, including:
  (1) a temperature sensor (43) positioned remote from said air gap; and
  (2) thermal conductor means (37) adjacent said axis of symmetry for transmitting heat from said air gap to said temperature sensor, said thermal conductor means including a tubular thermal conductor having a longitudinal axis that is collinear with said axis of symmetry, said permanent magnet and said pole member containing a longitudinal through bore through which one end of said thermal conductor extends, said thermal conductor containing an opening in which said temperature sensor is mounted.

10. Weighing apparatus, comprising:
(a) a frame (3);
(b) load-receiving means (9, 11) connected for movement from an initial first position relative to said frame;
(c) electromagnetic compensation means for displacing said load-receiving means toward said first position relative to said frame, said electromagnetic compensation means including:

(1) means (15) connected with said frame for producing a stationary permanent magnetic field containing an air gap (25);

(2) coil means (23) connected with said load-receiving means for movement in said air gap;

(3) position detecting means (35) for detecting displacement of said load-receiving means from said first position upon the application thereto of a load to be measured;

(4) compensating means for supplying compensating current to said coil means to produce a restoring electromagnetic force to maintain said load-receiving means at said first position against the force of the applied load; and (5) load-indicating means for displaying the magnitude of the applied load as a function of said compensating current;

(d) means for modifying said compensating current as a function of the instantaneous temperature adjacent said air gap, including:

(1) a temperature sensor (43) positioned remote from said air gap; and (2) thermal conductor means (37) for transmitting heat from said air gap to said temperature sensor; and (e) heat insulating means (45) for insulating said thermal conductor means against heat relative to said permanent magnetic field producing means.

11. Apparatus as defined in claim 10, wherein said heat insulating means comprises a tubular layer of insulating material heat-shrunk upon said thermal conductor.

* * * * *